Jan. 28, 1941. G. E. EWERTZ 2,230,137
AUTOMATIC GAUGE FOR LIQUID CONTAINERS
Filed April 27, 1938 2 Sheets-Sheet 2

Inventor:
Gordon E. Ewertz.
by Franklin E. Low.
Atty.

Patented Jan. 28, 1941

2,230,137

UNITED STATES PATENT OFFICE 2,230,137

AUTOMATIC GAUGE FOR LIQUID CONTAINERS

Gordon E. Ewertz, Elizabeth, N. J.

Application April 27, 1938, Serial No. 204,523

5 Claims. (Cl. 73—304)

This invention relates broadly to a gauge for liquid containers and particularly to an electrically operated gauge which is automatic in its action.

The primary object of the invention is to provide an electrically operated gauge for liquid containers, as, for example, water in tanks, or, a liquid supporting other non-mixing liquids, as, for example, water and oil, or other fluids having different electrical resistances.

Another object of the invention is to provide an apparatus that may be locally and/or remotely operated and observed, and that makes possible an accurate measuring of a liquid, as, for example, water ballast in a submarine.

Still another object of the invention is to provide an apparatus which has no moving parts within the container, and which is independent of the Baumé and salinity of the fluids in the container.

Still another object of the invention is to provide a gauge which is automatic in its operation and which has an indicator embodied therein which follows the level of the liquid in the container closely. As the apparatus is an electrically operated mechanism an important consideration in its operation is the elimination of electrolysis, and it is therefore an object of this invention to utilize a vacuum tube or tubes in the structure of the apparatus in such a manner that electrolysis in the container will be eliminated or be reduced to a negligible amount.

It is a well known principle that the plate current of a vacuum tube can be controlled by a grid potential. The plate current increases as the grid potential is made less negative to zero and from zero to a positive potential. The relays in the plate circuit can thereby be operated by a change of grid potential, and it is therefore an object of this invention to embody this principle in the structure of the apparatus.

The invention consists of an automatic gauge as set forth in the following specification and particularly as pointed out in the claims.

Referring to the drawings.

Like numerals refer to like parts throughout the several views of the drawings.

Figure 1:
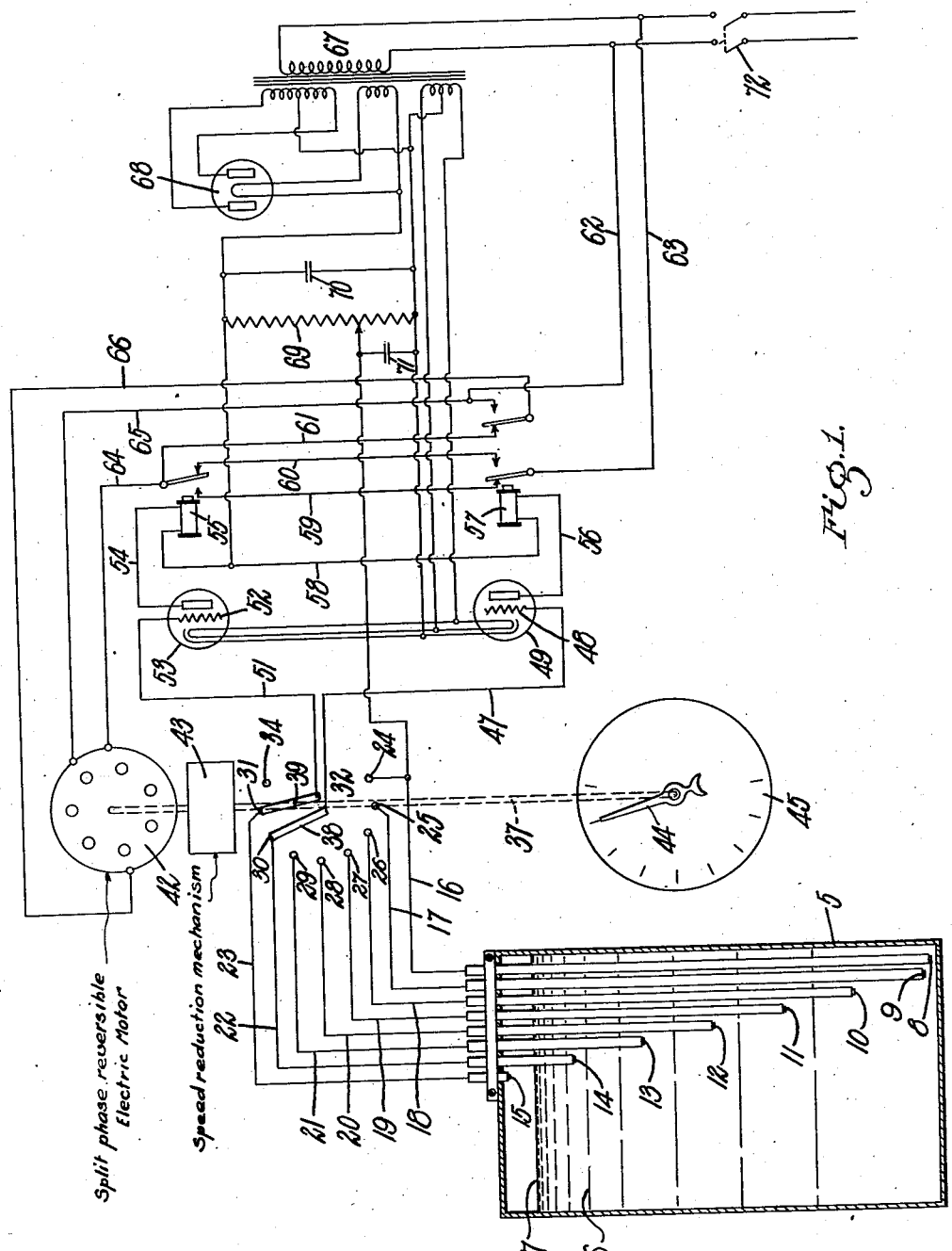
Fig. 1 represents a diagrammatical illustration of a gauge embodying my invention as applied to a storage tank for water.

In the drawings, 5 represents a container, as, for example, a storage tank for water 6, the level of which is indicated at 7. Mounted within the tank 5 are a plurality of electrodes 8, 9, 10, 11, 12, 13, 14 and 15, all insulated from each other and from the tank 5. As illustrated these electrodes consist of insulated rods of different lengths exposed to the fluids in the tank at different levels therein, but it is evident that said electrodes may be of any desired construction provided they have contact points embodied therein which are exposed to the fluids in the tank, are located at different elevations in the tank, and are insulated therefrom. They may also consist of plugs mounted at different levels on a closed tube located in the tank, or said plugs may be mounted in the side of the tank, if it is so desired, without departing from the spirit of the invention. The electrode 8 is common to all of the circuits which include the electrodes, and the tank 5 itself may be used as a common lead in place of the electrode 8 if it is so desired.

Figure 2:
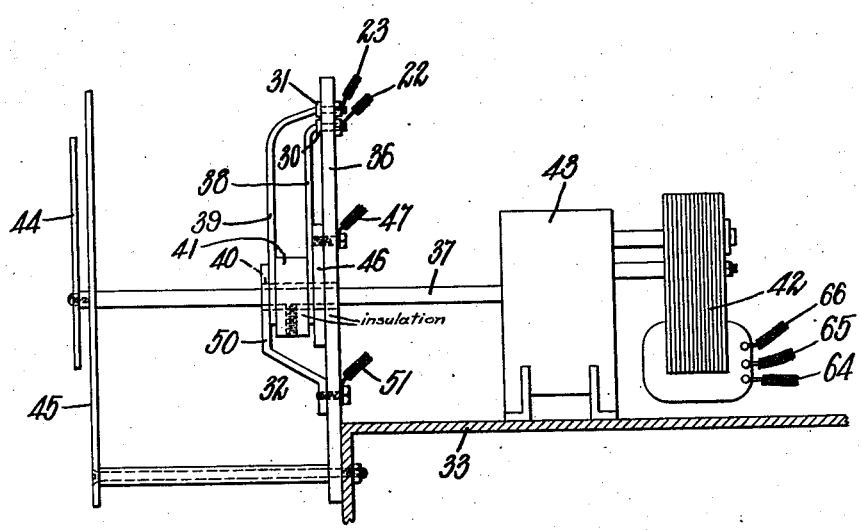
Fig. 2 is a side elevation of the mechanism for actuating the rotary switch and indicator.

The operating mechanism of the gauge may be located adjacent to the container 5 or at a distance therefrom and is as follows: The electrodes 8 to 15 inclusive are connected by wires 16 to 23 inclusive respectively to electric terminal members 24 to 31 inclusive respectively of a rotary selector switch 32 which is mounted upon a suitable base 33, see Fig. 2. Another terminal member 34 is provided for the switch 32, but said terminal member is blank, having no wire connected thereto for reasons hereinafter to be more fully set forth.

Figure 3:
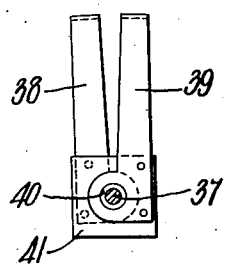
Fig. 3 is a front view of the switch arms.
Figure 4:
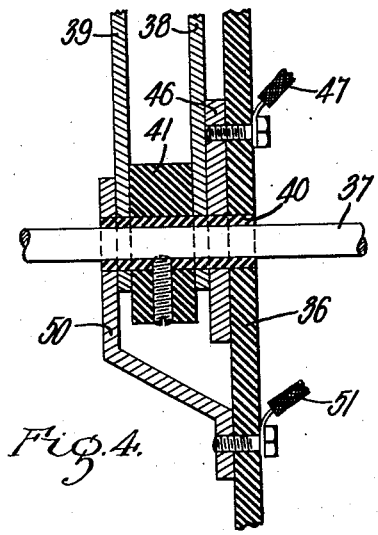
Fig. 4 is a detail vertical section illustrating the manner in which the switch arms are mounted and rotated.

The terminal members 24 to 31 inclusive and 34 are all mounted upon an insulating plate 36 concentric with the axis of a shaft 37 upon which switch arms 38 and 39 are mounted to rotate in unison therewith. The arms 38 and 39 are insulated from the shaft 37 by a sleeve 40 of insulating material, and are insulated one from another by a spacing collar 41 to which they are attached and which is rigidly secured to said shaft. The switch arms 38 and 39 are positioned out of step one with the other as illustrated in Fig. 3 to simultaneously contact with adjacent terminal members of the switch 32. The shaft 37 is rotated at a relatively slow rate of speed by means of a split phase reversible electric motor 42 through a speed reduction mechanism 43 mounted upon the base 33. The shaft 37 has an indicator 44 fastened thereto which is arranged to register with a calibrated dial 45.

The switch arm 38 during rotation is always in electrical contact with an electric conductor 46 which in turn is connected by means of a wire 47 to the grid 48 of a vacuum tube 49. The switch arm 39 during rotation is always in electrical contact with an electric conductor 50 which in turn is connected by a wire 51 to the grid 52 of a vacuum tube 53. It will be understood that the vacuum tubes 49 and 53 may be constructed as a single tube having two grids and two plates, and any type of vacuum tube having a grid may be used in place of the triodes illustrated.

Connected in the plate circuit of the vacuum tube 53 by a wire 54 is a single pole double throw relay 55, and connected in the plate circuit of the vacuum tube 49 by a wire 56 is a double pole double throw relay 57. The relays 55 and 57 are connected one to another by wires 58, 59, 60 and 61; to a source of electric supply by means of wires 62 and 63; and to the electric motor 42 by means of wires 64, 65 and 66 in such a manner that when the same potential is applied to the grids 48 and 52 of the vacuum tubes 49 and 53 respectively the motor is rotated in one direction or the other. When, however, one grid has one potential applied thereto and the other grid has a different potential applied thereto the relays 55 and 57 are so wired that the motor will not run in either direction. Any type of reversible electric motor with suitable relays may be used, or even two motors connected together and wound to rotate the shaft 37 in opposite directions may be used.

The vacuum tubes 49 and 53 are supplied with the proper voltages by a power pack which may consist of a transformer 67, a rectifier tube 68, an adjustable resistor 69, and filter condensers 70 and 71; all connected one to another in a well known manner and as illustrated in Fig. 1. A switch 72 is provided in the line to a suitable source of electricity which for the setup illustrated is A. C. current, but it is evident that with a proper power pack or batteries the gauge may be arranged to operate from any source of electricity either A. C. or D. C.

The grid potential for the vacuum tubes 49 and 53 is applied to the grids 48 and 52 respectively through the wire 16 to the electrode 8 and via the fluid of least electrical resistance to the other electrodes which in turn are connected to the switch 32 and through the switch arms 38 and 39 connected to said grids. Either a positive or a negative potential may be applied to the grid as circumstances and the element of safety may demand. In water storage tanks, as for example the water ballast tanks of submarines wherein electrolysis can create no hazard, the application of a positive potential will cause a minute current to flow in the container, but it is kept at such a low value that it can do no damage. In tanks, however, where volatile liquid fuels are stored, and wherein no electric current can be allowed, a negative potential applied to the grids eliminates the flow of current entirely, and the use of the gauge of this invention introduces no hazard to the handling of the fluids.

The general operation of the apparatus hereinbefore specifically described is as follows: Assuming that the level of the water in the container 5 is as indicated in Fig. 1; that the other fluid in the container is air; that the electrodes 8 to 14 inclusive are submerged in said water and that the electrode 15 is exposed to the non-conducting fluid, viz. the air in the container above said water; that the switch arms 38 and 39 are in engagement with the terminals 30 and 31 respectively; the indicator 44 of the dial 45 is stationary at a location which indicates the uppermost electrode that is submerged in the conducting fluid, viz. the water in the container. Under these conditions if a positive potential is applied to the grid 48 of the vacuum tube 49 the plate current of said tube is raised and the relay 57 is closed. Under the same conditions the electrode 15 being in the non-conducting fluid, viz. the air, a zero potential is applied to the grid 52 of the vacuum tube 53, the plate current of said tube is low, and the relay 55 is open. With the relays in these positions no electricity is applied to the motor and it is therefore stationary. If for any reason the water level in the tank is raised until it touches the electrode 15, a positive potential is applied to the grid 52 of the vacuum tube 53, the plate current of said tube rises and the relay 55 closes, whereupon the motor 42 is energized thereby causing the switch arms 38 and 39 to be rotated slowly in unison with the shaft 37 until the arm 38 contacts with the terminal member 31 and the arm 39 contacts with the isolated terminal member 34 thereby breaking the electric circuit through said arm. At this time a zero potential is applied to the grid 52 of the vacuum tube 53, the plate current of said tube drops, the relay 55 opens, and the motor 42 stops after having moved the indicator 44 to the position it assumes when the tank is full.

Now assume that the conducting fluid, viz. the water is discharged from the tank. As soon as the level of the water drops below the electrode 14 a zero potential is applied to the grid 48 of the vacuum tube 49, the plate current of said tube drops, the relay 57 opens, and the motor 42 starts running in the opposite direction from that in which it previously ran, until the arm 38 engages a terminal member which is connected to an electrode that is submerged in water whereupon a positive potential is applied to the grid 48 of the vacuum tube 49, the plate current of said tube rises, the relay 57 closes, and the motor stops after having moved the indicator to its correct indicating position in front of the dial 45.

The electrode 8 is a common lead and the level of the electrode 9 is the lowest point in the tank which can be read. As the level of the water drops the switch arms 38 and 39 successively engage the terminal members of the switch 32 until the arm 38 finally engages the terminal member which is connected by the wire 16 to the electrode 8. A positive potential is then applied to the grid 48 of the vacuum tube 49, the plate current of said tube rises and the relay 57 closes and stops the motor. At this time the level of the water is below the electrode 9, a zero potential is applied to the grid 52 of the vacuum tube 53, the plate current of said tube is lowered and the relay 55 opens.

In general, when one relay is open and the other closed the motor does not run. When both relays are closed the motor turns in one direction, and when both relays are open the motor turns in the opposite direction. The indicator moves when the motor is in operation and stops when the motor stops, and the entire operation of the apparatus is automatic.

During the operation of the device the operation of the split phase electric motor 42 is controlled by the relays 55 and 57 as follows: Assuming that conditions in the container 5 are as illustrated in Fig. 1, and that the switch arms 38 and 39 are contacting with the terminal members 30 and 31 respectively, there is a positive potential applied to the grid 48 of the vacuum tube 49 through the conducting fluid 6 between the electrodes 8 and 14. This positive grid potential causes the plate current of the tube 49 to rise and the relay 57 is therefore energized as indicated in Fig. 1. The electrode 15 being located in a non-conducting fluid, viz. the air above the water, there is a zero potential applied to the grid 52 of the vacuum tube 53, the plate current of said tube is low and the relay 55 is de-energized.

When the relays 57 and 55 are both energized as they are when the conducting fluid 6 contacts with the electrode 15, then the 110 volt A. C. supply line wire 63 is connected to the motor 42 by the wire 64; and the wire 66 from the split phase winding of said motor is connected to the wires 61, 64, 59 and 63. Under these conditions the motor will be energized and rotate the switch arms 38 and 39 in unison in a clockwise direction until they contact with the terminal members 31 and 34 respectively when the motor will stop because the terminal 34 is isolated. A zero potential will now be applied to the grid 52 of the vacuum tube 53 and the relay 55 will be de-energized.

Now assume that the switch arms 38 and 39 are in contact with the electric terminals 24 and 25 respectively and that the conducting fluid 6 has dropped below the electrode 9. Under these conditions a zero potential is applied to the grid 52 of the vacuum tube 53 and the relay 55 is de-energized. As the terminal member 24 is connected to the wire 16 which in turn is connected to the electrode 8 there is a positive potential applied to the grid 48 of the vacuum tube 49 and the relay 57 is energized.

When both grids 48 and 52 have a zero potential applied thereto, both relays 57 and 55 are de-energized. At this time the wire 63 from the source of electric supply connects with the wire 60 to the wire 64 and to the motor 42; and the lead 66 from the split phase winding of the motor 42 is connected to the wires 62 and 65, and under these conditions the motor will rotate the arms 38 and 39 in a counterclockwise direction.

It has hereinbefore been stated that any type of reversible electric motor with suitable relays may be used, and it will be apparent that different types of motors will require different wiring connections, all of which are well known to those skilled in the art and are within the scope of this invention.

I claim:

1. Liquid level responsive means comprising, in combination, a series of electrodes adapted to be positioned at different levels within a container and exposed to a liquid therein having electrical conductivity, a switch shiftable into circuit with various of said electrodes, a gauge, means in circuit with a source of electricity for operating said switch and gauge in unison, vacuum tube means including plates, and grids in circuit with the switch, and means responsive to change in the plate circuits of said vacuum tube means for controlling the operation of said switch and gauge operating means.

2. Liquid level responsive means comprising, in combination, a series of electrodes adapted to be positioned at different levels within a container and exposed to a liquid therein having electrical conductivity, a switch including terminals in circuit with said electrodes, and arms shiftable to contact various of said terminals, a gauge, means in circuit with a source of electricity for operating said switch arms and gauge in unison, vacuum tube means including plates, and grids in circuit with said arms, and relays in plate circuits of said vacuum tube means for controlling the operation of the actuating means for said arms and gauge.

3. Liquid level responsive means comprising, in combination, a series of electrodes adapted to be positioned at different levels within a container and exposed to a liquid therein having electrical conductivity, a series of terminals connected to said electrodes, and switch arms shiftable to contact various of said terminals, a gauge, a motor in circuit with a source of electricity for operating said switch arms and gauge in unison, vacuum tubes including plates, and grids in circuit with said switch arms, and means responsive to change in the plate circuits of said vacuum tubes for automatically controlling the operation of said motor.

4. Liquid level responsive means comprising, in combination, a series of electrodes adapted to be positioned at different levels within a container and exposed to a liquid therein having electrical conductivity, a switch including a series of terminals connected to said electrodes, and arms shiftable to contact various of said terminals, a gauge including an indicator, a reversible electric motor in circuit with a source of electricity for rotating said switch arms and indicator in unison, vacuum tube means including plates, and grids in circuit with said switch arms, and means responsive to change in the plate circuits of said vacuum tubes for automatically controlling the operation of said motor.

5. Liquid level responsive means comprising, in combination, a series of electrodes adapted to be positioned at different levels within a container and exposed to a liquid therein having electrical conductivity, a shaft, a switch including a series of terminals connected to said electrodes, and arms fast to said shaft and arranged to engage adjacent terminals simultaneously, means to insulate said arms one from the other and from said shaft, a gauge including an indicator fast to the shaft, a reversible electric motor in circuit with a source of electricity for rotating the shaft, vacuum tubes including plates, and grids in circuit with said switch arms, and relays in the plate circuits of the vacuum tubes for automatically controlling the operation of said motor.

GORDON E. EWERTZ.